United States Patent
Shamma et al.

(10) Patent No.: US 11,036,217 B2
(45) Date of Patent: Jun. 15, 2021

(54) CONTROLLING A VEHICLE USING A REMOTELY LOCATED LASER AND AN ON-BOARD CAMERA

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Jeff S. Shamma, Thuwal (SA); Mohammad Z. Shaqura, Thuwal (SA); Khalid Fahad Alzuhair, Thuwal (SA); Fadl Abdellatif, Thuwal (SA)

(73) Assignees: KING ABDULLAH UNIVERSITY OF SCIENCE AND TECHNOLOGY, Thuwal (SA); SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/048,256

(22) PCT Filed: Apr. 8, 2019

(86) PCT No.: PCT/IB2019/052884
§ 371 (c)(1),
(2) Date: Oct. 16, 2020

(87) PCT Pub. No.: WO2019/211680
PCT Pub. Date: Nov. 7, 2019

(65) Prior Publication Data
US 2021/0089022 A1 Mar. 25, 2021

Related U.S. Application Data

(60) Provisional application No. 62/778,075, filed on Dec. 11, 2018, provisional application No. 62/666,197, filed on May 3, 2018.

(51) Int. Cl.
*G05D 1/00* (2006.01)
*B64C 39/02* (2006.01)
(Continued)

(52) U.S. Cl.
CPC ......... *G05D 1/0016* (2013.01); *B64C 39/024* (2013.01); *B64D 47/02* (2013.01);
(Continued)

(58) Field of Classification Search
CPC ...... G05D 1/0016; G05D 1/0033; G05D 1/00; G05D 1/101; G05D 1/102; G05D 1/12;
(Continued)

(56) References Cited

U.S. PATENT DOCUMENTS 4,858,132 A * 8/1989 Holmquist ............... G01S 1/70
701/28
4,916,713 A * 4/1990 Gerber ...................... F41G 1/35
372/107
(Continued)

FOREIGN PATENT DOCUMENTS

JP 2007003079 A 1/2007

OTHER PUBLICATIONS

Adams, S.M., et al., "A Survey of Unmanned Aerial Vehicle (UAV) Usage for Imagery Collection in Disaster Research and Management," 9th International Workshop on Remove Sensing for Disaster Response, Jan. 2011, 8 pages.
(Continued)

*Primary Examiner* — Yonel Beaulieu
(74) *Attorney, Agent, or Firm* — Patent Portfolio Builders PLLC

(57) ABSTRACT

A vehicle is guided from an initial position to a target position using a projection of a laser beam on a target. A set of waypoints from the initial position of the vehicle to a position proximate to the target position is determined using
(Continued)

an orientation of a laser pointer that projects the laser beam and based on projection of the UAV initial position onto the laser beam pointing at the target. The vehicle is guided along the set of determined waypoints to the position proximate to the target position. The vehicle is guided from the position proximate to the target position using the optical system of the vehicle responsive to detection of a dot of the laser beam on the target by an optical system of the vehicle.

20 Claims, 9 Drawing Sheets

(51) Int. Cl.
  *B64D 47/02*   (2006.01)
  *B64D 47/08*   (2006.01)
(52) U.S. Cl.
  CPC ........... *B64D 47/08* (2013.01); *G05D 1/0033* (2013.01); *B64C 2201/027* (2013.01); *B64C 2201/127* (2013.01); *B64C 2201/14* (2013.01)
(58) Field of Classification Search
  CPC .......... B64D 47/08; B64D 47/02; G06T 7/00; G06T 7/70; H04B 10/00; H04B 10/112; H04B 10/1121; H04B 10/1129; H04B 10/50; H04B 11/00; G01S 17/02; G01S 17/04; G01S 17/06; B64C 39/02; B64C 39/024; B64C 2201/00; B64C 2201/02; B64C 2201/127; B64C 2201/027; B64C 2201/146; B64C 2201/14
  See application file for complete search history.

(56) References Cited

U.S. PATENT DOCUMENTS

| | | | | |
|---|---|---|---|---|
| 5,285,205 | A * | 2/1994 | White | B60Q 1/48 |
| | | | | 33/264 |
| 6,629,028 | B2 * | 9/2003 | Paromtchik | G05D 1/0236 |
| | | | | 180/169 |
| 8,471,812 | B2 * | 6/2013 | Bunch | G06F 3/042 |
| | | | | 345/157 |
| 9,675,229 | B2 | 6/2017 | Kwak et al. | |
| 2002/0027652 | A1 * | 3/2002 | Paromtchik | G05D 1/0297 |
| | | | | 356/141.1 |
| 2009/0103104 | A1 * | 4/2009 | Seko | G01S 17/46 |
| | | | | 356/498 |
| 2009/0267895 | A1 * | 10/2009 | Bunch | G06F 3/03543 |
| | | | | 345/157 |
| 2010/0023185 | A1 | 1/2010 | Terwelp et al. | |
| 2010/0250022 | A1 | 9/2010 | Hines et al. | |
| 2014/0123508 | A1 * | 5/2014 | Graesser | G01C 15/002 |
| | | | | 33/228 |
| 2014/0139435 | A1 * | 5/2014 | Bunch | G06F 3/033 |
| | | | | 345/163 |
| 2015/0276401 | A1 * | 10/2015 | Graesser | G01C 15/00 |
| | | | | 33/290 |

OTHER PUBLICATIONS

Apvrille, L., et al., "Indoor Autonomous Navigation of Low-Cost MAVs Using Landmarks and 3D Perception," Proceedings of Ocean and Coastal Observation, Sensors and Observing Systems, 2013, 3 pages, Computer Science.

Bachrach, A., et al., "Range-Robust Autonomous Navigation in GPS-Denied Environments," Journal of Field Robotics, May 11, 2011, vol. 28, No. 5, pp. 644-444, Wiley Periodicals, Inc.

Ballard, D.H., "Generalizing the Hough Transform to Detect Arbitrary Shapes," Pattern Recognition, Jan. 7, 1981, vol. 13, No. 2, pp. 111-122, Pergamon Press Ltd.

Benitez, W., et al., "Development of an UAV Prototype for Visual Inspection of Aerial Electrical Lines," 2016 Seventh Argentine Symposium and Conference on Embedded Systems (CASE), Aug. 12, 2016, pp. 7-12, IEEE.

Eschmann, C., et al., "Unmanned Aircraft Systems for Remote Building Inspection and Monitoring," 6th European Workshop on Structural Health Monitoring, Jan. 2012, 8 pages.

International Search Report in corresponding/related International Application No. PCT/IB2019/052884, dated Aug. 16, 2019.

Jiménez, A.R., et al., "A Comparison of Pedestrian Dead-Reckoning Algorithms using a Low-Cost MEMS IMU," WISP 2009, 6th IEEE International Symposium on Intelligent Signal Processing, Budapest, Hungary, Aug. 26-28, 2009, pp. 37-42, IEEE.

Kim, B.H., et al., "Quadcopter Flight Control Using a Low-Cost Hybrid Interface with EEG-Based Classification and Eye Tracking," Computers in Biology and Medicine, Apr. 29, 2014, vol. 51, pp. 82-92, Elsevier Ltd.

Kim, D.K., et al., "Deep Neural Network for Real-Time Autonomous Indoor Navigation," Nov. 15, 2015, 13 pages, arXiv:1511.04668v2 [cs.CV].

Murthy, M.D.P., "Design of a Quadcopter for Search and Rescue Operation in Natural Calamities," Thesis submitted to National Institute of Technology Rourkela, Apr. 20, 2015, 45 pages.

Ng, W.S.(F.), et al., "Collocated Interaction with Flying Robots," 20th IEEE International Symposium on Robot and Human Interactive Communication, Atlanta, GA, USA, Jul. 31-Aug. 3, 2011, pp. 143-149, IEEE.

Park, J.-G., et al., "Online Pose Classification and Walking Speed Estimation using Handheld Devices," Proceedings pf the 2012 ACM Conference on Ubiquitous Computing (UbiComp '12), Pittsburgh, USA, Sep. 5-8, 2012, 10 pages, Association for Computing Machinery (ACM).

Quigley, M., et al., "ROS: an open-source Robot Operating System," ICRA Workshop on Open Source Software, Jan. 2009, 6 pages.

Sa, I., et al., "Vertical Infrastructure Inspection Using a Quadcopter and Shared Autonomy Control," Field and Services Robotics, Dec. 31, 2013, pp. 219-232, Springer-Verlag Berlin Heidelberg.

Sanna, A., et al., "A Kinect-Based Natural Interface for Quadrotor Control," Entertainment Computing, Jan. 20, 2013, vol. 4, pp. 179-186, International Federation for Information Processing Published by Elsevier B.V.

Sudarma, M., et al., "Design of Quadcopter Robot as a Disaster Environment Remote Monitor," International Journal pf Electrical and Computer Engineering (IJECE), Feb. 2016, vol. 6, No. 1, pp. 188-197, Institute of Advanced Engineering and Science.

Tsan, T., et al., "Nonlinear Controller Design for Wall Inspection by a Quad Rotor Helicopter under Wind Disturbance," 2016 International Electronics Symposium (IES), Sep. 29-30, 2016, pp. 7-12, IEEE.

Written Opinion of the International Searching Authority in corresponding/related International Application No. PCT/IB2019/052884, dated Aug. 16, 2019.

Zakeri, H., et al., "Rahbin: A Quadcopter Unmanned Aerial Vehicle Based on a Systematic Image Processing Approach Toward an Automated Asphalt Pavement Inspection," Automation in Construction, Sep. 20, 2016, vol. 72, pp. 211-235, Elsevier B.V.

* cited by examiner

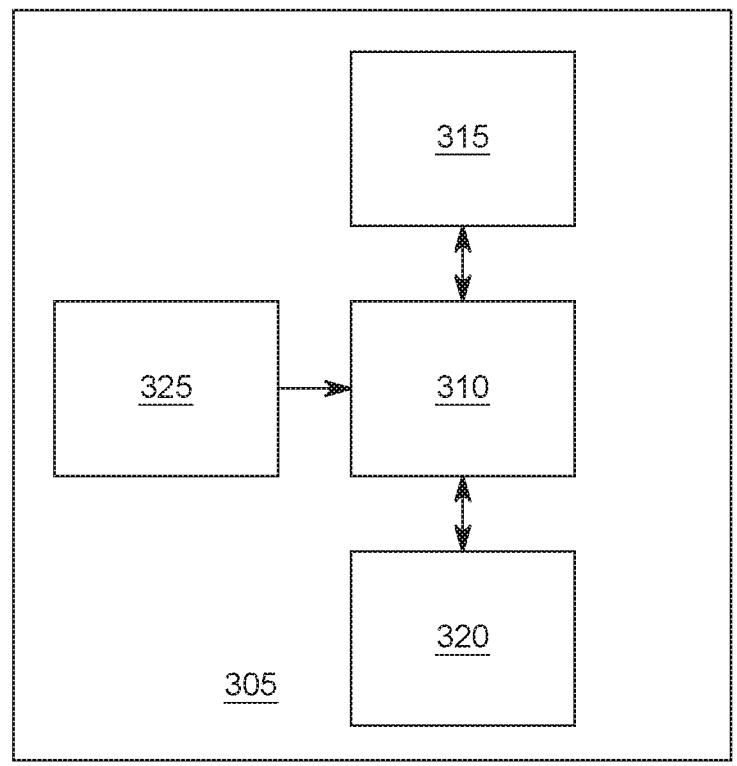
FIG. 3
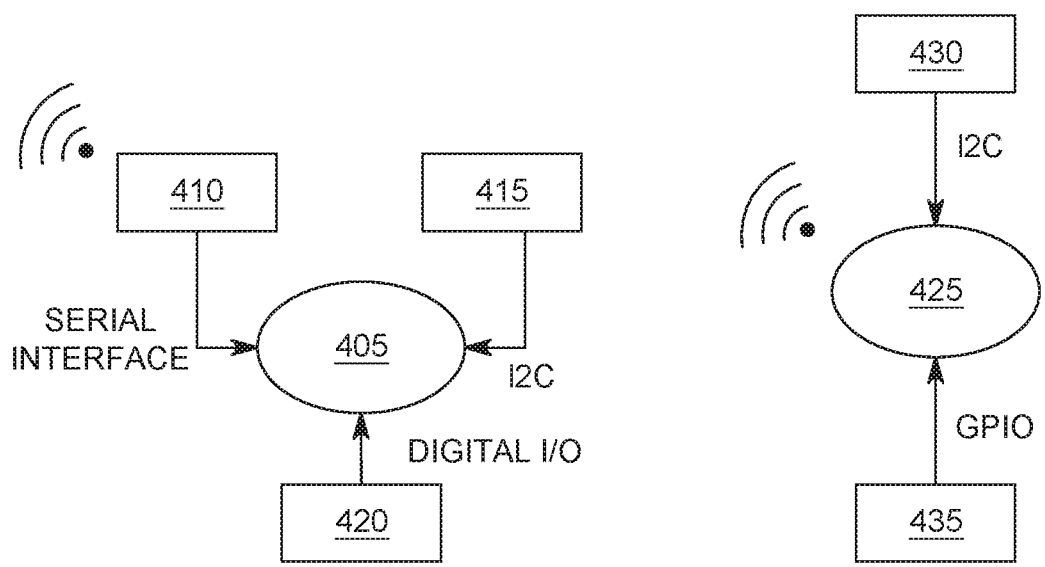
FIG. 4A
FIG. 4B

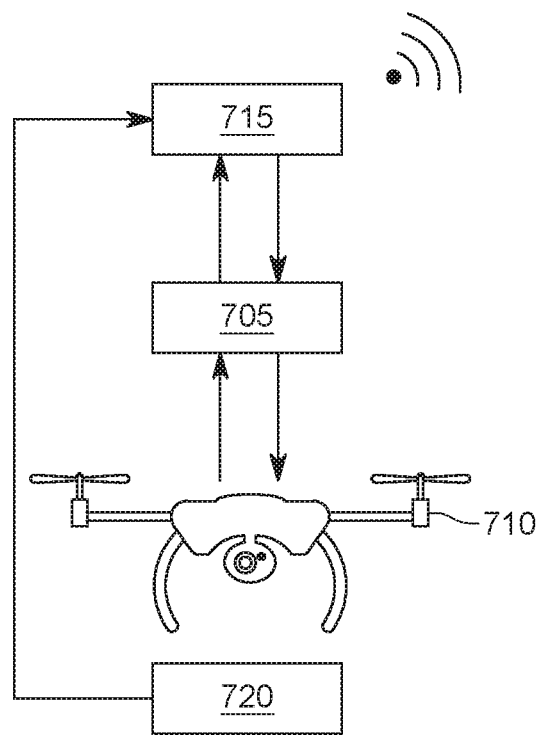
FIG. 7
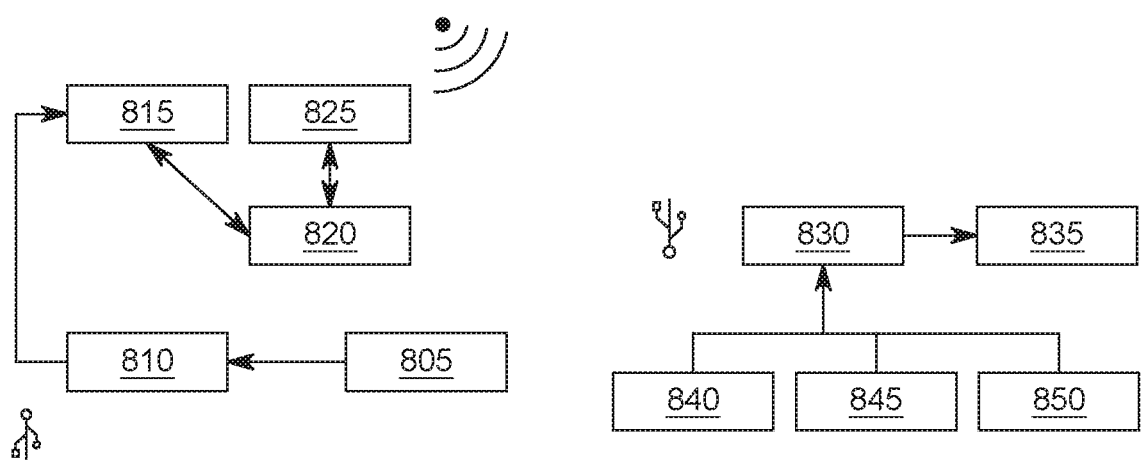
FIG. 8A
FIG. 8B

CONTROLLING A VEHICLE USING A REMOTELY LOCATED LASER AND AN ON-BOARD CAMERA

CROSS-REFERENCE TO RELATED APPLICATIONS

This application is a U.S. National Stage of International Application No. PCT/IB2019/052884, filed on Apr. 8, 2019, which claims priority to U.S. Provisional Patent Application No. 62/666,197, filed on May 3, 2018, entitled "AN INSTRUMENTED LASER POINTING DEVICE FOR REMOTELY PILOTING AN AUTONOMOUS MOBILE PLATFORM," and U.S. Provisional Patent Application No. 62/778,075, filed on Dec. 11, 2018, entitled "CONTROLLING A VEHICLE USING A REMOTELY LOCATED LASER AND AN ON-BOARD CAMERA," the disclosures of which are incorporated herein by reference in their entirety.

BACKGROUND

Technical Field

Embodiments of the disclosed subject matter relate generally to systems and methods of controlling a vehicle first in a laser guidance mode in which a laser beam is used to determine a set of waypoints to a destination and then switching to a vision-based mode in which a camera of the vehicle is used to move the vehicle into position at the destination.

Discussion of the Background

Over the past several years, the size and cost of UAVs have decreased while the maneuverability of UAVs has increased. These UAVs typically incorporate cameras, which also continue to decrease in size and cost, while also performing better in terms of specifications and capabilities. Accordingly, UAVs are now being used for wide variety of applications, such as inspecting structures, for example for structural damage, etc. UAVs are particularly useful for inspecting structures that are not easily accessible by people, such as tall structures. For example, industrial facilities typically have portions that are not easily accessible by workers but nonetheless require annual inspection plans for quality control and addressing any potential problems. UAVs can be used to capture images (either still images or video streams), which allow an operator of the UAV to assess the structure and take appropriate actions.

There currently are two basic ways of using a UAV to inspect structures. The first is for the UAV to operate completely autonomously so that the UAV is provided with a destination, for example defined using GPS coordinates, then the UAV will calculate the path to the destination and follow the calculated path. This requires a great deal of pre-planning because if there is any error in the information regarding the position of the destination, the UAV will autonomously move to an incorrect position. This is particularly likely to happen when inspecting structures that are not easily accessible because the precise position of these structures may not be known in advance.

Another way to use a UAV to inspect structures is by manually controlling the UAV's path to the destination using a remote controller. This technique requires a trained operator because manual control of a UAV is difficult, and the UAV must be carefully aligned with the destination so that it can capture images of the destination (e.g., the structure).

Thus, it would be desirable to provide systems and methods for operating UAVs that do not require a great deal of preplanning and do not require a skilled operator to control the UAV.

SUMMARY

According to an embodiment, there is a method for guiding a vehicle from an initial position to a target position using a projection of a laser beam on a target. A set of waypoints from the initial position of the vehicle to a position proximate to the target position is determined using an orientation of a laser pointer that projects the laser beam and based on projection of the UAV initial position onto the laser beam pointing at the target. The vehicle is guided along the set of determined waypoints to the position proximate to the target position. The vehicle is guided from the position proximate to the target position using the optical system of the vehicle responsive to detection of a dot of the laser beam on the target by an optical system of the vehicle.

According to another embodiment, there is a system. The system includes an unmanned aerial vehicle (UAV), comprising a processor coupled to a wireless communication interface and an optical system comprising an imager. The system also includes a laser pointer comprising a processor coupled to wireless communication interface, a laser emitter, and a pose estimation module. The processor of the UAV is configured to guide the UAV along a set of determined waypoints from an initial position of the UAV to a position proximate to a target position based on a laser beam emitted from the laser emitter. The processor of the UAV is also configured to guide the UAV, responsive to detection of the laser beam impinging on a target using an image captured by the imager, from the position proximate to the target position to the target position using the optical system.

According to a further embodiment, there is an unmanned aerial vehicle (UAV), which includes a processor, a wireless communication interface coupled to the processor, and an optical system comprising an imager. The processor is configured to guide the UAV along a set of determined waypoints from an initial position of the UAV to a position proximate to a target position based on a laser beam emitted from a laser emitter of a laser pointer. The processor is also configured to guide the UAV, responsive to detection of the laser beam impinging on a target using an image captured by the imager, from the position proximate to the target position to the target position using the optical system.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 is a block diagram of a laser pointer according to an embodiment;

FIGS. 4A and 4B are block diagrams of specific hardware that can be used for a laser pointer according to embodiments;

FIG. 7 is a block diagram of specific hardware that can be used for a UAV according to an embodiment;

FIGS. 8A and 8B are block diagrams of software modules for the UAV's companion computer and flight control unit, respectively, according to embodiments;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of unmanned aerial vehicles. However, the embodiments can be employed with any type of vehicle.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
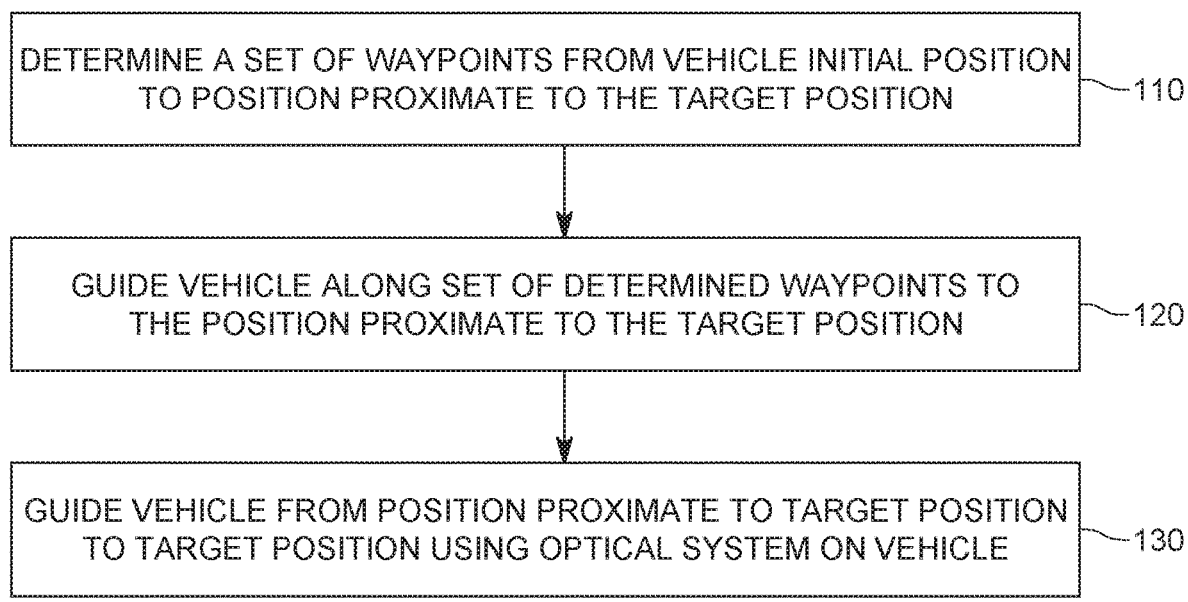
FIG. 1 is a flowchart of a method for guiding a vehicle from an initial position to a target position using a projection of a laser beam on a target according to an embodiment.

FIG. 1 is a flowchart of a method for guiding vehicle from an initial position to a target position using a projection of a laser beam on a target according to an embodiment. Initially, a set of waypoints from the UAV initial position to a position proximate to the target position is determined using an orientation of a laser pointer that projects the laser beam and based on projection of the UAV initial position onto the laser beam pointing at the target (step 110). The UAV is then guided along the set of determined waypoints to the position proximate to the target position (step 120). Finally, responsive to detection of a dot of the laser beam on the target by an optical system of the vehicle, the vehicle is guided from the position proximate to the target position using the optical system of the vehicle (step 130). Thus, as will be appreciated, the vehicle initially operates in a laser guidance mode in step 120, and once the vehicle detects the dot of the laser beam, the vehicle is operated in a vision-based control mode using the optical system of the vehicle. Should the laser dot move when the vehicle is operated in the vision-based control mode, the vehicle's path will follow the movement of the laser dot because it will be tracking the laser dot using its optical system.

The method of FIG. 1 has been described in connection with a vehicle, which can be a land-, water-, and/or air-based vehicles. For ease of description, embodiments will be described in which the vehicle is an unmanned aerial vehicle (UAV). However, the discussion below applies equally to other types of vehicles.

Figure 2A:
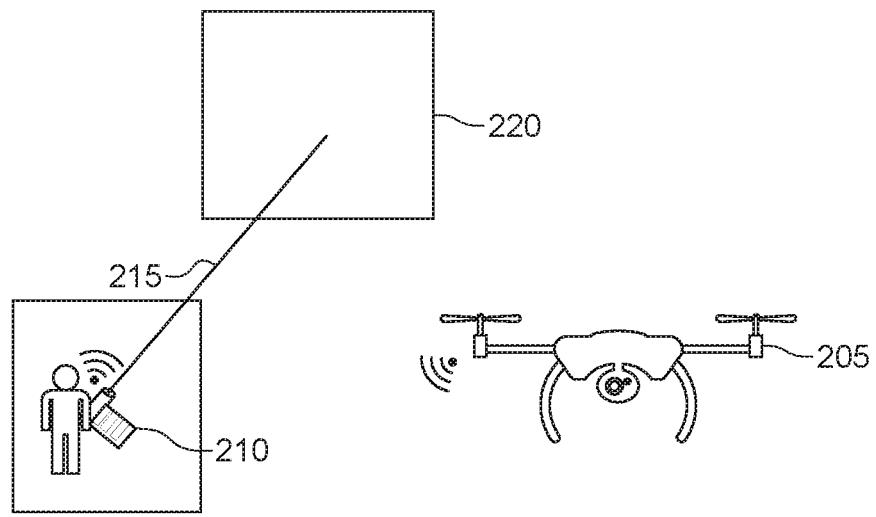
FIGS. 2A and 2B are block diagrams of systems for guiding an unmanned aerial vehicle, UAV, from an initial position to a target position using a projection of a laser beam on a target according to embodiments.
Figure 2B:
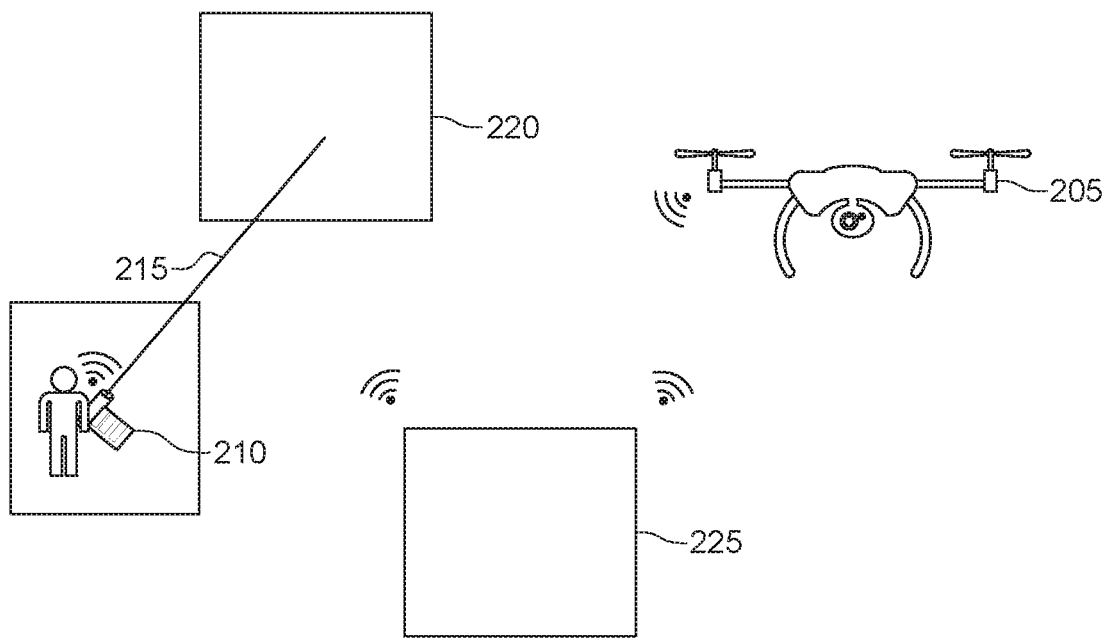

FIGS. 2A and 2B are block diagrams of two different system configurations for guiding UAV from an initial position to a target position using a projection of a laser beam on a target. The system illustrated in FIG. 2A includes a UAV 205, a laser pointer 210, which points a laser beam 215 at the destination 220. In the system illustrated in FIG. 2A, the UAV 205 and the laser pointer 210 communicate directly with each other using wireless communication. For example, the laser pointer 210 can determine the set of waypoints and communicate the determined set of waypoints to the UAV 205. Alternatively, or additionally, the laser pointer 210 can provide the UAV 205 with information that the UAV 205 can use to determine the set of waypoints. It should be recognized that direct communication between the UAV 205 and the laser pointer 210 can include one or more signal repeaters between the UAV 205 and the laser pointer 210.

The system illustrated in FIG. 2B includes all of the components of the system in FIG. 2A, and also includes a base station 225. In one embodiment, base station 225 is interposed in the communication path between the UAV 205 and the laser pointer 210 so that information from the UAV is sent to the laser pointer 210 via base station 225, and vice-versa. Additionally, or alternatively, the base station can be used to offload processing that is performed by the UAV 205 and/or laser pointer 210, which will be described in more detail below. For example, the base station 225 can receive information from the laser pointer 210 in order to determine the set of waypoints and the base station 225 can then provide the determined set of waypoints to the UAV 205. The base station 225 can also include a display, which shows the video captured by the UAV 205, as well as information about the operation of the UAV 205, such as flight speed, heading, etc.

FIG. 3 is a block diagram of a laser pointer according to an embodiment. The laser pointer 305 includes a processor 310 coupled to a wireless communication interface 315, a laser emitter 320, and a pose estimation module 325. The wireless communication interface 315 can employ any type of wireless communication technique, such as Bluetooth, WiFi, 3G, 4G, 5G, etc. The laser emitter 320 can include any type of emitter that is capable of emitting a laser beam. The pose estimation module 325 estimates the orientation and position of the laser pointer 305, and as discussed below, can be an inertial measurement unit (IMU).

FIGS. 4A and 4B illustrate specific hardware that can be used for a laser pointer according to embodiments. The hardware arrangement in FIG. 4A employs a microcontroller and the hardware arrangement in FIG. 4B employs a microprocessor (also referred to as a central processing unit (CPU)).

Turning first to FIG. 4A, the laser pointer includes a microcontroller 405 coupled to a wireless communication interface 410, an inertial measurement unit (IMU) 415, and a switched-laser circuit 420. The microcontroller 405 can be, for example, a 32-bit MCU clocked at 80 MHz and having 2 MB of onboard memory. The wireless communication interface 410 can be, for example, a Wi-Fi communication module, such as an ESP8266 Wi-Fi module, which can communicate with the microcontroller 405 using a serial connection. The inertial measurement unit 415 can be, for example, a 9-axis bno055 inertial measurement unit from Bosch, which can communicate with the microcontroller 405 using an inter-integrated circuit (I2C) bus. The laser emitter is a switched-laser circuit 420, which can, for example, be an embedded circuit having a laser diode that emits a laser beam and a switch, the actuation of which causes the laser beam to be emitted. As discussed in more detail below, the laser pointer can be implemented using one or multiple laser beams. Implementing the laser pointer with multiple laser beams can involve incorporating multiple laser emitters in the laser pointer.

Turning now to FIG. 4B, this microprocessor implementation of the laser pointer includes a microprocessor-based computer 425, such as a Raspberry Pi-zero running, for example, a Raspbian Linux operating system (OS), and the robotics operating system (ROS). Those skilled in the art will recognize that ROS has become the standard operating system for robotic systems. The microprocessor-based computer 425 includes a microprocessor (not illustrated), random access memory, and an embedded wireless communication interface, such as a Wi-Fi interface. An inertial measurement unit 430 can be, for example, a 9-axis myAHRS+ inertial measurement unit (IMU), which can communicate with the microcontroller 405 using an inter-integrated circuit (I2C) bus connected to the general-purpose input output (GPIO) of the microprocessor-based computer 425. The switched-laser circuit 435 can be configured in a similar manner to that discussed above with respect to switched-laser circuit 420, and can include a single laser diode or multiple laser diodes.

It should be recognized that the particular hardware discussed in connection with FIGS. 4A and 4B are merely examples of the types of hardware that can be used for the laser pointer. Other types of hardware and configuration of hardware can be employed for the laser pointer so long as the hardware, in connection with software (as applicable), can perform the functions of the laser pointer described herein.

Figure 5:
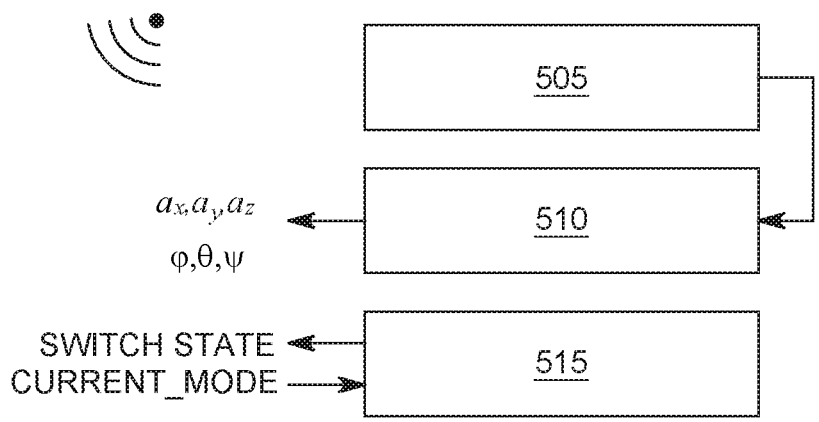
FIG. 5 is a block diagram of software modules of a laser pointer according to embodiments.

FIG. 5 is a block diagram of software modules of a laser pointer according to embodiments. The software modules include three robot operating system (ROS) nodes, 505, 510, and 515. ROS node 505 handles the inertial measurement unit 120 interface and register reads. ROS 510 handles any necessary data conversion and extraction of physical quantities (e.g., raw measurements and angular rates) and outputs the filtered linear acceleration components of the laser pointer ($a_x$, $a_y$, $a_z$) and its attitude angles: roll ($\varphi$), pitch ($\theta$), and yaw ($\psi$). ROS node 515 manages the detection of laser switching (i.e., the laser diode being switched on or off) and the feedback laser diode(s). It should be recognized that the software modules illustrated in FIG. 5 are merely examples of the types of software modules that can be employed and that other software modules can be employed consistent with the present invention.

Figure 6:
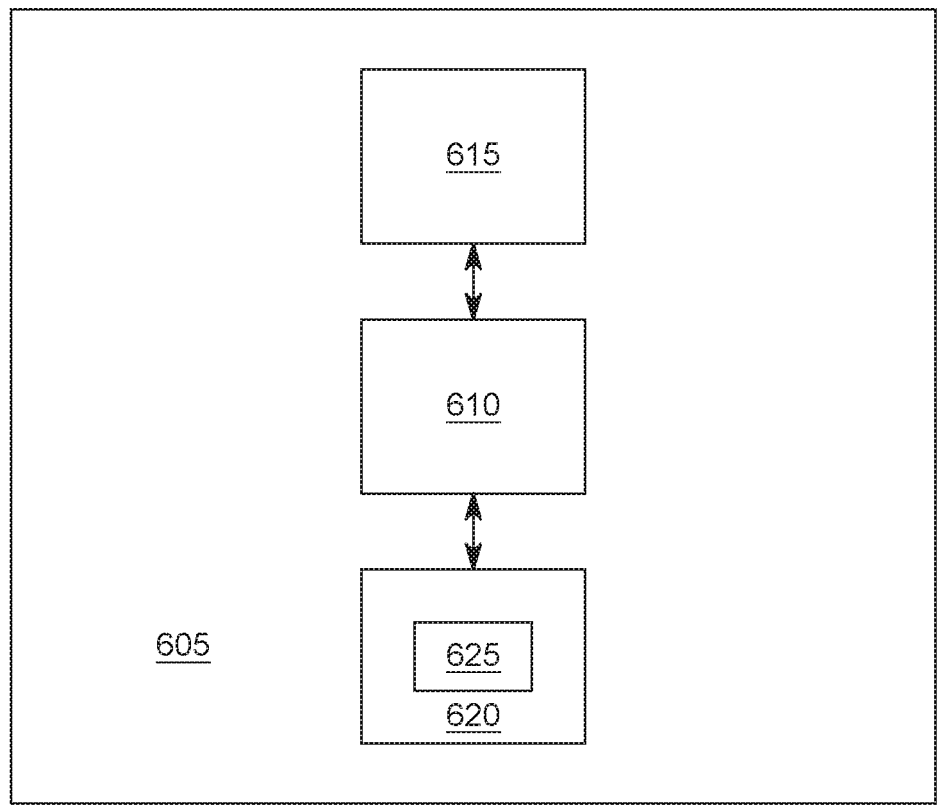
FIG. 6 is a block diagram of a UAV according to embodiments.

FIG. 6 is a block diagram of a UAV according to embodiments. The UAV 605 includes a processor 610 coupled to a wireless communication interface 615 and an optical system 620, which includes an imager 625. The optical system 620 can be any type of optical system, including those operating using stereo imaging, ultrasound imaging, LIDAR imaging, RGBD imaging, and/or the like. The wireless communication interface 615 can employ any type of wireless communication technique, such as Bluetooth, WiFi, 3G, 4G, 5G, etc.

FIG. 7 is a block diagram of specific hardware that can be used for a UAV according to an embodiment. The UAV includes, as the processor 610, a flight control unit 705 coupled to the heading and propulsion control systems 710 and coupled to a companion computer 715. The flight control unit 705 can be, for example, a MindPX controller running PX4 firmware to handle low-level flight management. The companion computer 715 can be, for example, an Odriod XU4 by Hardkernel running a minimum Linux Ubuntu distribution, and performs high-level control of the UAV and onboard vision sensing of the emitting laser beam. Further, the companion computer 715 includes an integrated wireless interface, which for the Odriod XU4 is a Wi-Fi interface. The companion computer 715 is configured to be the ROS master in a network that includes the UAV, the laser pointer, and the base station (if implemented). The companion computer 715 is connected to the flight control unit 705 over a serial connection utilizing the MAVROS package and MAVLINK library. Thus, in the laser guidance mode of operation, the heading and propulsion system 710 and companion computer guide the UAV toward the destination using a set of waypoints calculated using an orientation of the laser dot that projects the laser beam and based on a projection of the UAV initial position onto the laser beam pointing at the target. Once the laser dot is detected by the imager 720, the UAV switches to a vision-based control mode, as described in more detail below.

The imager 720 is coupled to provide captured images to companion computer 715. The imager 720 can be, for example, Pixy CMUcam5 programmable camera or oCam 1CGN-U global shutter board camera. The Pixy module provides a standalone image processing device with onboard dual-core processor in which pixel coordinates of the detected target can be acquired by the companion computer 715 and then published to other software nodes existing on the companion computer 715 itself or any device in the network, such as the laser pointer or a base station. While this camera offloads the image processing burden from the companion computer 715, it prevents the utilization of more advance off-the-shelf image processing libraries such as OpenCV. In contrast, the oCam camera does not perform any internal processing but instead passes the image to the companion computer 315 that can handle more complex computer vision processing.

It should be recognized that in FIG. 7 element 710 corresponds to the heading and propulsion system of the UAV and that the flight control unit 705, companion computer 715, and imager 720 are part of the UAV (i.e., either integrated within or attached to the UAV body frame). It should also be recognized that the particular hardware described in connection with FIG. 7 is merely one example and that the UAV can be implemented consistent with the present invention using other types of hardware.

FIGS. 8A and 8B are block diagrams of software modules for the UAV's companion computer and flight control unit, respectively, according to embodiments. Turning first to FIG. 8A, the companion computer software includes a planning node 815, which plans the UAV's maneuvers in both the laser guidance mode and the vision-based control mode. In the laser guidance mode, the planning is based on a set of waypoints calculated using an orientation of the laser dot that projects the laser beam and based on a projection of the UAV initial position onto the laser beam pointing at the target. Once the image acquisition node 805 detects the dot of the laser in an acquired image, the UAV switches to the vision-based control mode. Specifically, images acquired from an imager by an image acquisition node 805 are provided to an image processing node 810, which processes the images (as described in more detail below) and passes extracted data from the processed images to the planning node 815. In the vision-based control mode, the planning node 815 uses the data extracted from the processed images to control the planning of the UAV's maneuvers to move from the position proximate to the target position into the target position. The UAV can be equipped with a proximity sensor, such as a LIDAR or ultrasound sensor, to assist in the alignment so that the imager is perpendicular to the target. The results of the planning node 815 are passed to an offboard control node 820, which uses MAVROS 825 to communicate the results of the planning (i.e., the flight maneuvers for the UAV) to the flight control unit 705. The planning node 815 also plans the UAV's maneuvers with respect to the waypoints based on information provided by the laser pointer using MAVROS over a wireless communication channel. As indicated by the symbol on the bottom left-hand side of FIG. 8A, the companion computer can also include a USB interface for communicating with the flight control unit. It should be recognized, however, that other types of interfaces can be used for communication between the companion computer and the flight control unit.

Turning now to FIG. 8B, the flight control unit software includes a firmware node 830, which can be, for example, PX4 firmware that supports offboard control via MAVLINK node 835. The offboard control allows the UAV to be guided using control signals sent to it from an external source, which in this embodiment is the flight control unit 705. The firmware node 830 receives data from a position control node 840, power management node 845, and estimation node 850. The position control node 840 controls the attitude, altitude, and position of the UAV, which can be implemented using, for example, tunable cascaded-PID control. The power management node 845 is responsible for managing power of the UAV. The estimation node 850 uses filtered sensor data to compute the state of the UAV, including position, velocity, and attitude. As indicated by the symbol on the upper left-hand side of FIG. 8B, the flight control unit includes a USB interface for communicating with the companion computer. Again, the USB interface can be replaced by any other type of interface for communication between the companion computer and the flight control unit. If the system is implemented with a base station, the flight control unit 705 communicates with it through MAVROS on the companion computer 715.

It should be recognized that the particular software modules illustrated in FIGS. 8A and 8B are merely examples of software modules and that other software modules can be used consistent with the present invention.

Figure 9:
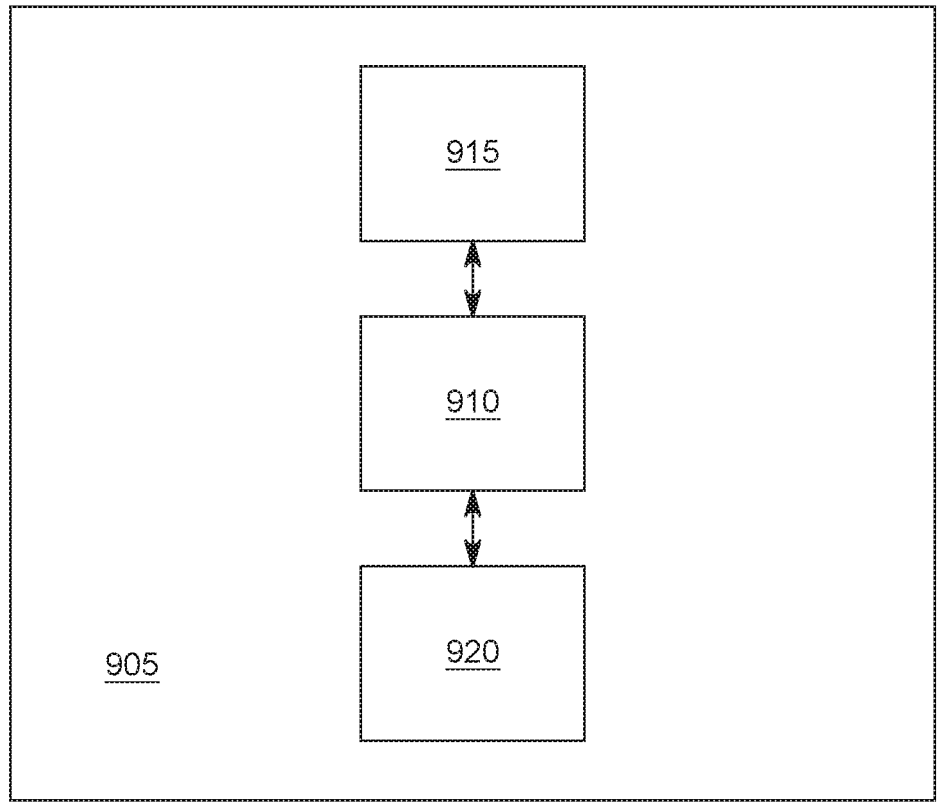
FIG. 9 is a block diagram of a base station according to embodiments.

FIG. 9 is a block diagram of a base station according to embodiments. The base station 905 includes a processor 910 coupled to a wireless communication interface 915 and an output device 920. The wireless communication interface 915 operates using the same type of wireless communication protocol as the UAV and the laser pointer. The processor 910 includes memory for running various software nodes, which will be discussed below in connection with FIG. 10. The output device 920 can be, for example, a display that can output information about the flight path of the UAV, as well as display images captured by the UAV's imager.

Figure 10:
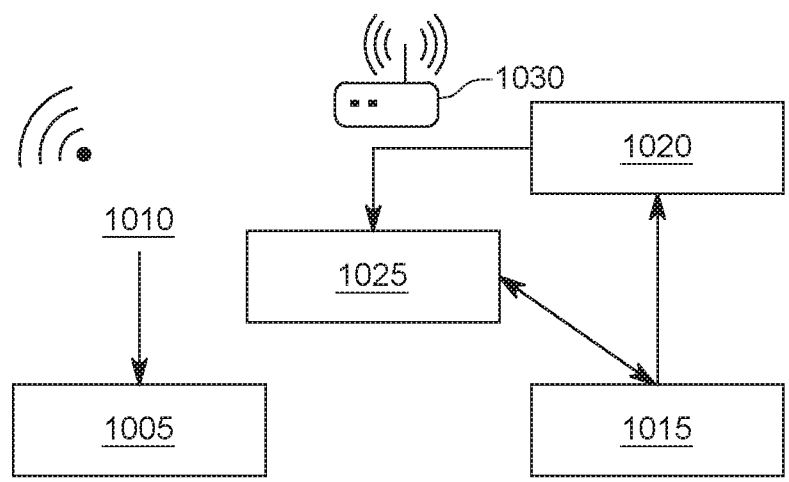
FIG. 10 is a block diagram of software modules of a base station according to embodiments.

FIG. 10 is a block diagram of software modules of a base station according to embodiments. The base station software includes an image subscriber/display node 1005 arranged to receive a video stream 1010 from the UAV. The base station software also includes a flight monitoring node 1015, which monitors the UAV's flight. If the flight monitoring node 1015 determines that there are abnormal conditions (e.g., the UAV is not following the determined path of waypoints or any other deviation), the flight monitoring node 1015 instructs the emergency landing/kill node 1020, which can either control the UAV to conduct an emergency landing or completely kill the UAV's power so that it falls to the ground. The flight monitoring node 1015 and the emergency landing/kill node 1020 communicate with the UAV via MAVROS node 1025. The base station software also includes a repeater node 1030, which can forward data and signals received from the UAV to the laser pointer and vice-versa. It should be recognized that the particular software modules described in connection with FIG. 10 are merely examples and that the base station can be implemented using other software modules consistent with the present invention.

Figure 11:
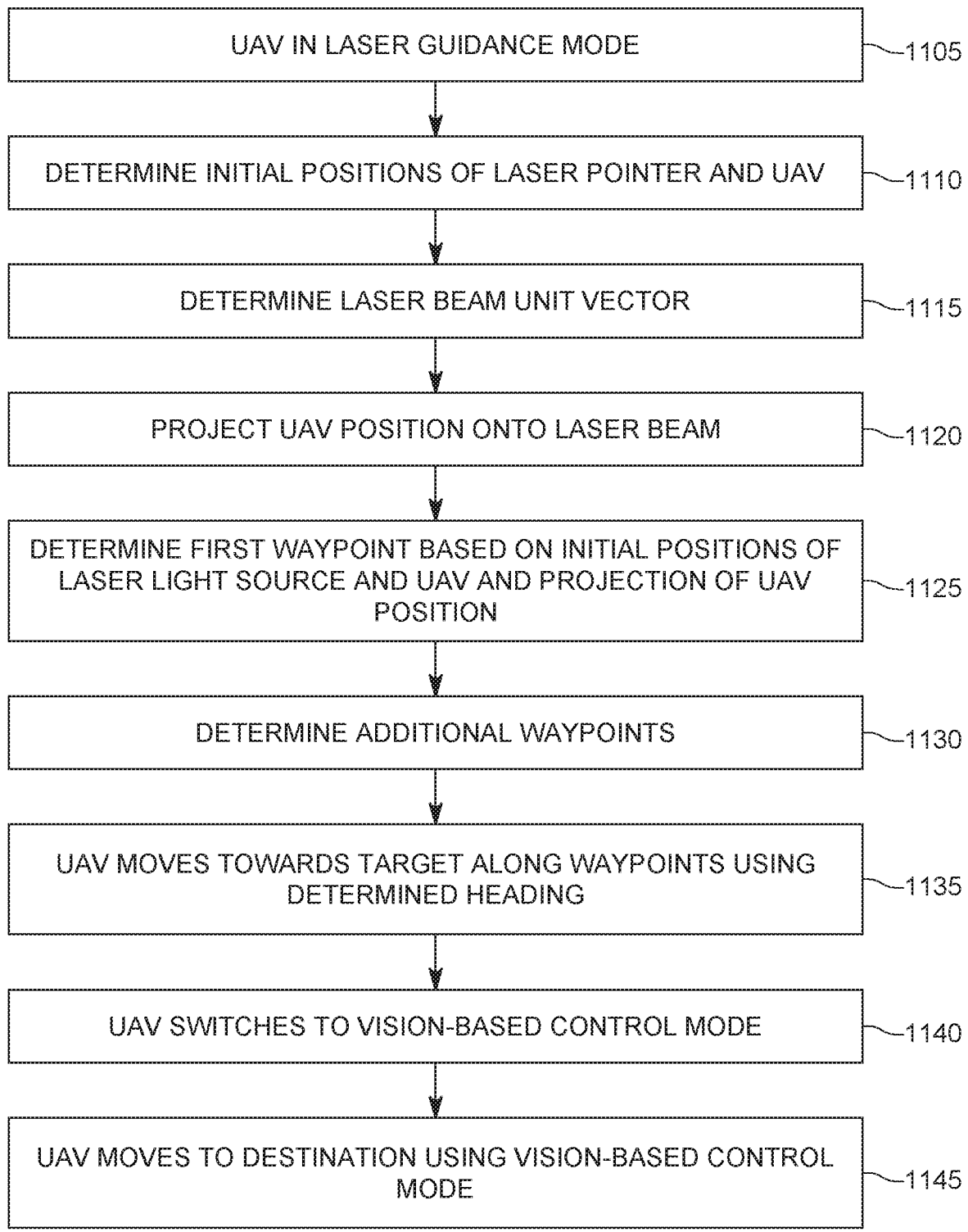
FIG. 11 is a flowchart of a method for guiding UAV from an initial position to a target position using a projection of a laser beam on a target according to an embodiment.
Figure 12:
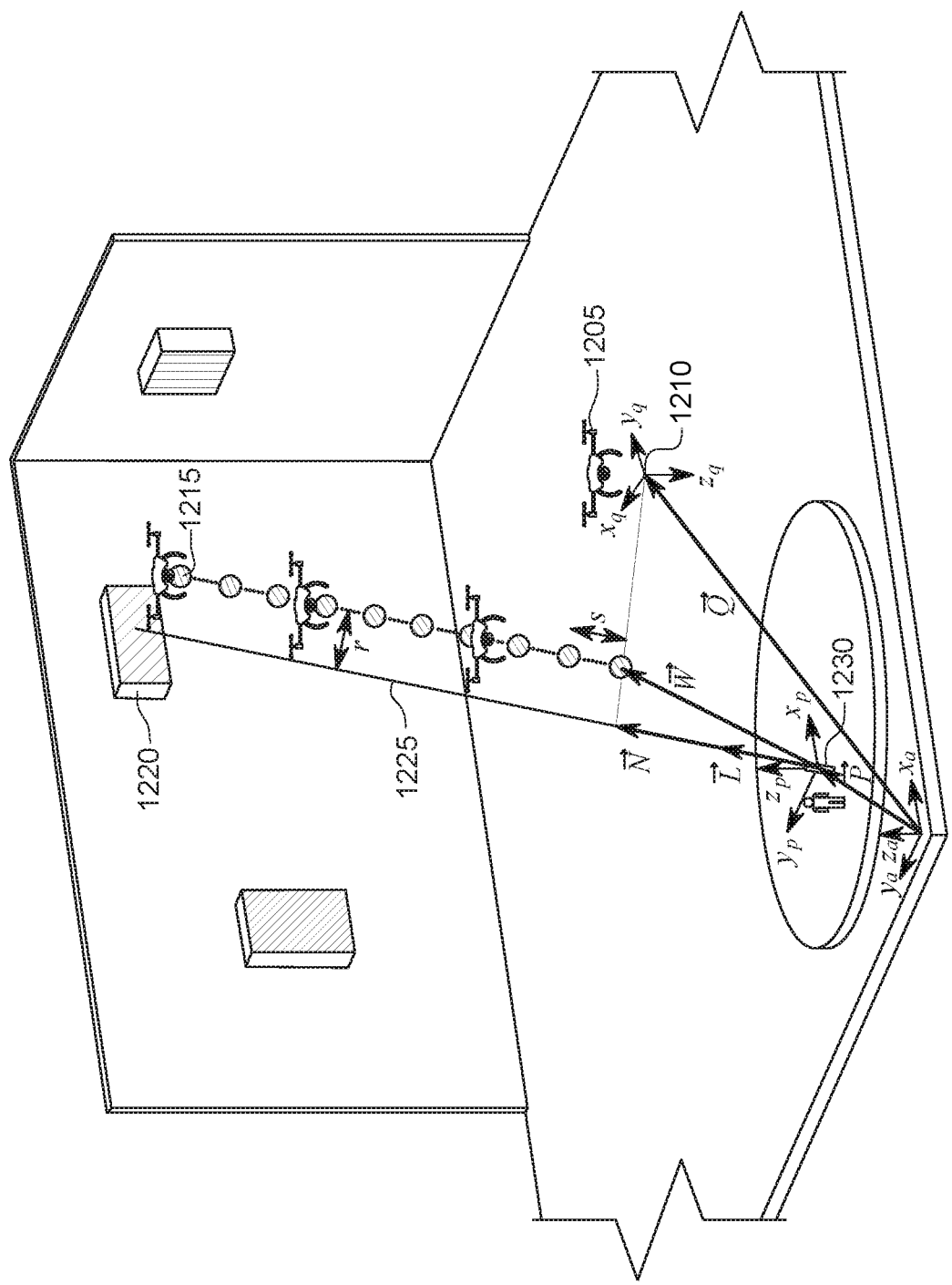
FIG. 12 is a block diagram of a system for guiding UAV from an initial position to a target position using a projection of a laser beam on a target according to an embodiment.

FIG. 11 is a flowchart of a method for guiding UAV from an initial position to a target position using a projection of a laser beam on a target according to an embodiment, which will be described in connection with FIG. 12. As illustrated in FIG. 12, this method involves three coordinate frames, an inertial reference frame ($x_a$, $y_a$, $z_a$), UAV body frame ($x_q$, $y_q$, $z_q$), and the laser pointer frame ($x_p$, $y_p$, $z_p$). The inertial reference frame is fixed and follows a global translational convention. The UAV body frame follows the convention of the flight control unit. The laser pointer frame corresponds to the axes of the inertial measurement unit of the laser pointer. The UAV's imager is active during this method so that once the laser beam dot is detected in images captured by the UAV's imager, the UAV can switch to the vision-based control mode.

Initially, the UAV 1205 is in laser guidance mode, which as discussed in more detail below involves following a set of calculated waypoints from the UAVs initial position 1210 to a position 1215 proximate to the target 1220 at which the laser beam 1225 is impinging (step 1105). The UAV 1205 can be set to laser guidance mode, for example, based on a command sent from the laser pointer 1230 or the base station (if one is implemented). Next, the initial positions of the laser pointer 1230 and the UAV 1205 are determined (step 1110). This can be achieved, for example, by initially placing the laser pointer 1230 on or in the same position as the UAV 1205 and then moving the laser pointer 1230 to the position from which it will be operated. Data from the inertial measurement unit of the laser pointer can then be used to determine the three-axis change of position of the laser pointer from its initial position on or in the same position as the UAV to the position from which the laser pointer will be operated. The initial pitch angles of the laser pointer and the UAV are assumed to be sufficiently small (i.e., $\Theta_{p_i} \sim 0$, $\Theta_{q_i} \sim 0$) but their initial headings will initially be different. This difference is referred to as the heading offset, which can be represented by the following equation:

$$\Delta \psi_i = \psi_{p_i} - \psi_{p_i} \quad (1)$$

The UAV laser guidance mode involves the calculation of a set of waypoints, which are separated by a step size s. The calculated waypoints define a path that closely follows the laser beam 1225 emitted by the laser pointer 1230 but is offset from the laser beam 1225 by a distance r, which prevents the UAV 1205 from obstructing the laser beam 1225, which would make it difficult for the operator of the laser pointer 1230 to dot the laser beam 1225 at intended target 1220. In order to facilitate the calculation of the set of waypoints, five three-dimensional vectors are defined. The first two of the three-dimensional vectors are defined in the inertial global frame ($x_a$, $y_a$, $z_a$) and are the laser pointer 1230 position (i.e., the position of the operator of the laser pointer 1230) $\vec{P}$ and the UAV position $\vec{Q}$ in 3D space.

Accordingly, part of the determination of the initial positions of the UAV 1205 and the laser pointer 1230 involves calculating the laser pointer 1230 position $\vec{P}$ and the UAV position $\vec{Q}$ in 3D space as follows:

$$\vec{P} = \begin{bmatrix} p_x \\ p_y \\ p_z \end{bmatrix}, \vec{Q} = \begin{bmatrix} q_x \\ q_y \\ q_z \end{bmatrix} \tag{2}$$

The initial UAV position $\vec{Q}$ can be the position at which the laser pointer 1230 is placed on or in the same position as the UAV 1205 and the initial laser pointer 1230 position $\vec{P}$ can be calculated using data from the inertial measurement unit of the laser pointer 1230, which represents the movement of the laser pointer 1230 from the position at which the laser pointer 1230 is placed on or in the same position as the UAV 1205 to the position at which the laser pointer 1230 is operated so as to emit a laser beam 1225 on the target 1220.

The third three-dimensional vector is the laser unit vector $\vec{L}$, which is defined in the frame of the laser pointer ($x_p$, $y_p$, $z_p$) and has a length of one unit. The laser unit vector $\vec{L}$ always points along the laser beam 1225 towards the target 1220 and is calculated (step 1115) using the orientation measurements obtained from the inertial measurement unit embedded in the laser pointer as follows:

$$\vec{L} = \begin{bmatrix} l_x \\ l_y \\ l_z \end{bmatrix} = \begin{bmatrix} \cos(\theta_p)\cos(\psi_p) \\ \cos(\theta_p)\sin(\psi_p) \\ \sin(\theta_p) \end{bmatrix} \tag{3}$$

In order to calculate the first waypoint, the UAV position is projected onto the laser beam 1225 (step 1120), which defines the projected position vector $\vec{N}$ in the pointing device reference frame ($x_p$, $y_p$, $z_p$) as follows:

$$\vec{N} = \begin{bmatrix} n_x \\ n_y \\ n_z \end{bmatrix} = (\vec{L} \cdot (\vec{Q} - \vec{P}))\vec{L} \tag{4}$$

Next, the first waypoint is determined based on the initial positions of the laser pointer 1230 and UAV 1205 and the projection of the UAV position (step 1125). Specifically, the laser occlusion offset r is applied to calculate the position vector of the first waypoint $\vec{N}$ defined as well in the pointing device reference frame as follows:

$$\vec{W} = \begin{bmatrix} w_x \\ w_y \\ w_z \end{bmatrix} = \vec{N} + r\frac{\vec{Q} - \vec{P} - \vec{N}}{\|\vec{Q} - \vec{P} - \vec{N}\|} \tag{5}$$

The additional waypoints are then determined (step 1130). Specifically, each consecutive waypoint is provided by the following equation, which incorporates a simple addition of predefined steps parallel to the laser line.

$$\vec{W}_k = \vec{W} + k\,s\vec{L} \tag{6}$$

The waypoints are converted to the global inertial frame ($x_a$, $y_a$, $z_a$), as shown in the following equation.

$$\vec{W}_{k_{global}} = \vec{W}_k + \vec{P} \tag{7}$$

The waypoints can be provided to the UAV 1205 all at once or can be provided at a constant frequency to achieve the desired speed until the laser beam impinging on the target or an obstacle has been detected. The determination of the five vectors and the waypoints can be performed by the UAV 1205, the laser pointer 1230, and/or the base station (if one is implemented). In one example, the laser pointer 1230 can determine the five vectors and pass this information to the UAV 1205 or the base station (if one is implemented), which then determines the waypoints. If a base station calculates the waypoints, the base station can transmit them directly to the UAV 1205 or to the UAV 1205 via the laser pointer 1230. In another example, the laser pointer 1230 determines the five vectors and the waypoints and then transmits them to the UAV 1205, either directly or via the base station (if one is implemented) so that the UAV can determine the set of waypoints using this information.

While waypoints are used to control the position of the UAV, its heading command $\psi_c$ is set such that it is pointing toward the target 1220 while compensating for any initial deviation between the UAV heading and that of the pointer, as reflected in the following formula.

$$\psi_c = \psi_q + \psi_p - \Delta\psi_i \tag{8}$$

Accordingly, the UAV 1205 then moves towards the target 1220 following the determined set of waypoints and the determined heading (step 1135).

Once the UAV 1205 detects the laser beam dot impinging on the target 1220 using its imager(s), the UAV switches to a vision-based control mode (step 1140). This switch occurs in response to detecting the laser beam dot and can occur even if there are additional waypoints that have been provided while in the laser guidance mode.

Initially, in the vision-based control mode, the UAV 1205 maintains its current position and starts adjusting its position in body frame ($x_q$, $y_q$, $z_q$) in order to align the camera with so that it can view the laser beam dot impinging on the target 1220 (step 1145). This alignment can employ a proximity sensor, such as a LIDAR or ultrasound sensor, so that the camera is perpendicular to the target In inertial frame, the position vector is represented by:

$$\begin{bmatrix} x_a \\ y_a \\ z_a \end{bmatrix} = \begin{bmatrix} \cos(\psi_q) & -\sin(\psi_q) & 0 \\ \sin(\psi_q) & \cos(\psi_q) & 0 \\ 0 & 0 & 1 \end{bmatrix} \begin{bmatrix} x_q \\ y_q \\ z_q \end{bmatrix} \tag{9}$$

During vision-based alignment control, the UAV 1205 remains in its current position $\theta_q \sim 0$ and $\varphi_q \sim 0$. After the alignment control is completed, the UAV 1205 is moved towards the laser beam dot according to the vision-based control mode. Specifically, using the processed images of the detected laser beam dot, the UAV calculates the data that is used to command the UAV's translational motion in three-dimensional space and rotational motion in the yaw direction. The roll and pitch of the UAV are automatically handled by the UAV to stay level.

In order to assist with the movement of the UAV 1205, along the path of waypoints and during the vision-based control mode, the UAV 1205 can include an onboard obstacle avoidance sensing and mechanism, such as a stereo vision or ultrasound system. If, during the vision-based control mode, the UAV 1205 does not sense the laser beam 1225 impinging on the target 1220, the UAV 1205 can, for example, return to a home position or maintain its current position until detecting the laser beam 1225 impinging on the target 1220. Similarly, if the waypoints are provided to the UAV 1205 at a constant frequency to achieve the desired speed and the UAV 1205 is at the most recently received waypoint and has not received information related to the next waypoint, the UAV 1205 can, for example, return to a home position or maintain its current position until the UAV 1205 receives the next waypoint.

The detection of the dot of the laser beam 1225 impinging on the target 1220 involves a three-stage sensing technique. The first stage is to set the exposure of the imager. In order to detect the laser beam, the UAV's imager is configured to capture with low exposure settings, which reduces reflections and focuses the image on shiny elements. The imager's exposure can be experimentally adjusted based on the particular imager used in case the initial exposure setting is so low that the UAV cannot distinguish the reflection of the laser beam 1225 on the target 1220 from other light sources in the environment.

The second stage involves applying an RGB filter to one or more images captured by the UAV's imager using a range that differentiates color of the reflection of the laser beam 1225 from target 1220 from surfaces with different colors and finishes. The filtered image includes the laser dot and some light reflection noise depending on the target orientation. The third stage involves applying a Hough circle transform to the filtered image to search for and detect the correct circle. The range of circle radii can be computed offline and mapped to a lookup table that is a function of the estimated distance between the source and the target. If the laser pointer includes multiple laser emitters, the UAV can include a single imager to control the movement during the vision-based control mode. If the laser pointer includes only a single laser emitter, the UAV can have two imagers (i.e., a stereo imager) in order to control the movement during the vision-based control mode. Alternatively, data from one imager can be fused with a proximity measurement from the target and the pose estimation node to align with the target. As a further alternative, when there is a single laser emitter, a single imager can be used to control the movement during the vision-based control mode.

Implementing the laser pointer so that it emits multiple laser beams can improve the operation of the UAV 1205 in the vision-based control mode. For example, the laser pointer can include three laser emitters that are spaced apart in an equilateral triangle and configured so that the corresponding emitted laser beams propagate through space in a parallel arrangement. Assuming the laser pointer is perpendicular to the target, the spots on the target from the three laser beams will form an equilateral triangle having approximately the same spacing between the laser points as the spacing between the laser emitters in the laser pointer. The UAV can then use a single imager to control both its orientation with respect to the target and distance from the target by correlating a number of pixels between the laser dots to an actual distance between the laser dots. In this case, the UAV's processor can include a correlation value between distance between adjacent pixels and actual distance in a captured image, which can be configured, for example, prior to implementation of the UAV in the system.

Figure 13A:
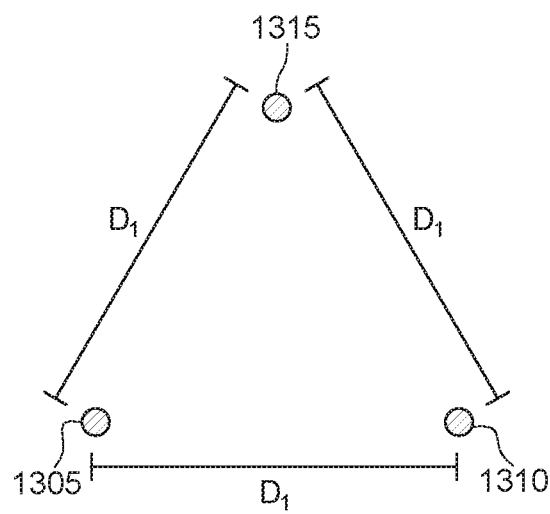
FIG. 13A illustrate an arrangement of laser emitters in an equilateral triangle according to embodiments.
Figure 13B:
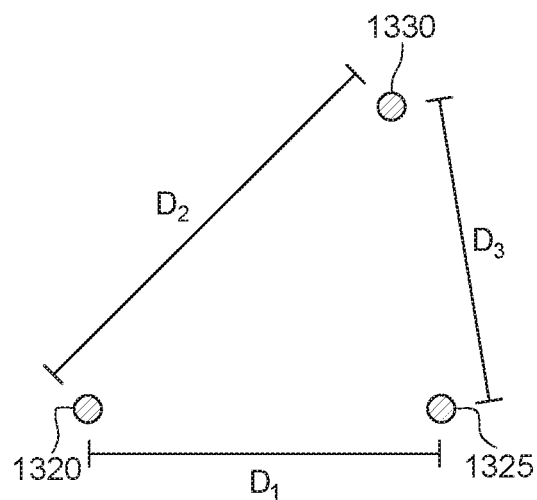
FIGS. 13B-13D illustrate different relationships between laser dots impinging on a target according to embodiments.
Figure 13C:
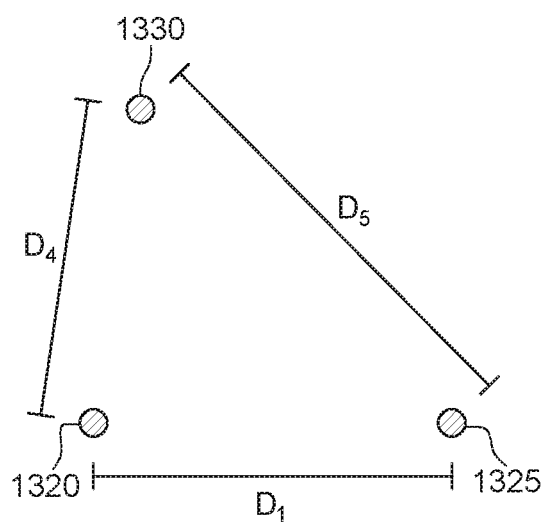

Specifically, referring now to FIGS. 13A-13D, assume that the laser pointer includes three laser emitters separated by a distance $D_1$, as illustrated in FIG. 13A. When the UAV is perpendicularly facing the target, the imager of the UAV should capture an image with the three laser dots being separated by the same number of pixels in the captured image. If, however, the UAV is not perpendicularly facing the target, the three laser dots will not form an equilateral triangle and will not be separated by the same number of pixels, as illustrated in the examples of FIGS. 13B and 13C.

In FIG. 13B, the distance $D_1$ between the laser dots 1320 and 1325 is the same as the distance $D_1$ between the corresponding laser emitters 1305 and 1310. However, the distance $D_2$ between laser dots 1320 and 1330 is greater than the distance $D_1$ between laser emitters 1305 and 1315, and the distance $D_3$ between laser dots 1325 and 1330 is less than the distance $D_1$ between laser emitters 1310 and 1315, which indicates that the UAV's imager is not perpendicular to the target, i.e., the left side of the imager is farther from the target than the right side of the imager. In FIG. 13C, the distance $D_1$ between the laser dots 1320 and 1325 is the same as the distance $D_1$ between the corresponding laser emitters 1305 and 1310. However, the distance $D_4$ between laser dots 1320 and 1330 is less than the distance $D_1$ between laser emitters 1305 and 1315, and the distance $D_5$ between laser dots 1325 and 1330 is greater than the distance $D_1$ between laser emitters 1310 and 1315, which indicates that the UAV's imager is not perpendicular to the target, i.e., the right side of the imager is farther from the target than the left side of the imager. The UAV's processor can use this information to adjust its orientation (i.e., heading) with respect to the target so that the three laser dots form an equilateral triangle, which results in the UAV's imager being perpendicular to the target.

Figure 13D:
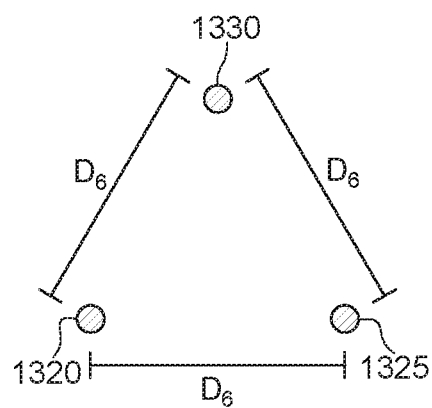

Turning now to FIG. 13D, which illustrates the laser dots 1320-1330 being arranged in an equal lateral triangle having sides with a distance between the laser dots of $D_6$. Because the UAV's imager captures an image in which the three laser dots form an equilateral triangle, the UAV's imager is oriented perpendicular to the target. In this example, however, the distances $D_6$ between the laser dots is smaller than the distances $D_1$ between the laser emitters. This indicates that the UAV's imager is farther away from the target than desired because when the UAV's imager is at the correct target position, the number of pixels for each side of the equilateral triangle formed by laser dots 1320-1330 should approximately correlate to the same as between the laser emitters 1305-1315. It should be recognized that in practice the distances $D_6$ will be slightly less than the distances $D_1$ so that there is sufficient spacing between the target and the UAV's imager. Determining the amount of spacing that is sufficient can involve, for example, the minimum focal distance of the UAV's imager (the sufficient spacing should not be less than the minimum focal distance of the UAV's imager), a distance that ensures that the UAV does not touch the target (because the distance between the UAV's imager and portions of the UAV's body can be different), etc.

If the laser pointer is not oriented perpendicular to the target, the laser pointer can determine the angle between the laser emitters and the target and convey this information to the UAV. The UAV's processor can then use this angular information to determine the length of the sides of the triangle formed by the laser dots 1320-1330 when the UAV's imager is perpendicular to the target and use this information to adjust the orientation of the UAVs imager with respect to the target. The UAV can include an onboard proximity sensor to assist in determining the nominal reflected pattern from the target, which should be the final view when the UAV reaches its final position.

Accordingly, once the UAV 1205 confirms that it is in the correct position, based on the three-stage sensing technique, the UAV 1205 continues to capture images of the target 1220, which can be used for a variety of purposes, such as inspecting the target.

In the discussion above, the laser beam forms a dot on the target. The term dot is intended to cover various shapes of the laser beam impinging upon the target or any other surface. Thus, for example, laser beam shaping can be implemented so that the laser beam impinging on the target forms a particular shape, such as a cross-hair. The skew in the particular shape can be used to infer direction similar to the three laser embodiment described above.

It should be recognized that the various devices of the system can include additional hardware than what was discussed above. Further, it should be recognized that the software of the various devices can include additional software than what was described above.

Although exemplary embodiments have been illustrated in connection with a UAV using a copter-based system for movement, the present invention can employ a UAV having any type of system for moving the UAV as disclosed herein.

The disclosed embodiments provide systems and methods for guiding UAV from an initial position to a target position using a projection of a laser beam on a target according to an embodiment. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for guiding a vehicle from an initial position to a target position using a projection of a laser beam on a target, the method comprising:
   determining, using an orientation of a laser pointer that projects the laser beam, a set of waypoints from the initial position of the vehicle to a position proximate to the target position based on projection of the vehicle initial position onto the laser beam pointing at the target;
   guiding the vehicle along the set of determined waypoints to the position proximate to the target position; and
   guiding, responsive to detection of a dot of the laser beam on the target by an optical system of the vehicle, the vehicle from the position proximate to the target position using the optical system of the vehicle.

2. The method of claim 1, wherein the guiding of the vehicle using the optical system comprises:
   detecting a projection of the laser beam on the target; and
   guiding the vehicle from the position proximate to the target position to the target position using the detected projection of the laser beam.

3. The method of claim 2, wherein the detecting the position of the projection of the laser beam on the target comprises:
   capturing, using the optical system on the vehicle, an image containing the projection of the laser beam on the target;
   filtering the captured image to generate a filtered image; and
   applying a Hough circle transform to the filtered image.

4. The method of claim 1, further comprising:
   determining the initial position of the vehicle;
   determining an initial position of a laser pointer projecting the laser beam; and
   projecting the initial position of the vehicle onto the laser beam to determine a pointing direction of the laser pointer,
   wherein a first waypoint of the set of waypoints is determined based on the initial position of the vehicle, the initial position of the laser pointer, and the pointing direction of the laser pointer.

5. The method of claim 4, further comprising:
   determining additional waypoints of the set of waypoints based on the first waypoint and the pointing direction of the laser pointer.

6. The method of claim 4, wherein the laser pointer determines the set of waypoints, the method further comprising:
   providing, by the laser pointer to the vehicle, the determined set of waypoints.

7. The method of claim 4, wherein the vehicle determines the set of waypoints, the method further comprising:
   providing, by the laser pointer to the vehicle, the initial positions of the vehicle and of laser pointer.

8. The method of claim 4, wherein a base station determines the set of waypoints, the method further comprising:
   providing the initial positions of the vehicle and of the laser pointer to the base station; and
   providing, by the base station to the vehicle, the set of waypoints.

9. The method of claim 1, wherein the laser beam comprises a first laser beam, a second laser beam, and a third laser beam, wherein the first, second, and third laser beams are spaced apart to form an equilateral triangle and the first, second and third laser beam form corresponding first, second, and third laser dots on the target, the method further comprising:
   determining, by the vehicle, a distance in pixels between the first, second, and third laser dots;
   adjusting an orientation of the vehicle to the target or the UAV's distance from the target based on the distance in pixels between the first, second, and third laser dots.

10. The method of claim 1, wherein the laser beam is a single laser beam or comprises two laser beams.

11. A system, comprising:
    an unmanned aerial vehicle, UAV, comprising a processor coupled to a wireless communication interface and an optical system comprising an imager; and
    a laser pointer comprising a processor coupled to wireless communication interface, a laser emitter, and a pose estimation module wherein the processor of the UAV is configured to guide the UAV along a set of determined waypoints from an initial position of the UAV to a position proximate to a target position based on a laser beam emitted from the laser emitter; and the processor of the UAV is configured to guide the UAV, responsive to detection of the laser beam impinging on a target using an image captured by the imager, from the position proximate to the target position to the target position using the optical system.

12. The system of claim 11, wherein the processor of the UAV or of the laser pointer is configured to determine the set of waypoints based on projection of the UAV initial position onto the laser beam, which is pointing at the target.

13. The system of claim 11, further comprising:
a base station comprising a processor coupled to a wireless communication interface,
wherein the processor of the base station is configured to determine a set of waypoints from a UAV initial position to the position proximate to the target position based on projection of the UAV initial position onto the laser beam, which is pointing at the target.

14. The system of claim 11, wherein the laser emitter comprises a first laser emitter, second laser emitter, and third laser emitter, which respectively project a first, second, and third laser beam, and wherein the first, second, and third laser beams are spaced apart to form an equilateral triangle and the first, second and third laser beam form corresponding first, second, and third laser dots on the target, wherein the processor of the UAV is configured to
determine a distance in pixels between the first, second, and third laser dots;
determine adjustments to an orientation of the UAV to the target or the UAV's distance from the target based on the distance in pixels between the first, second, and third laser dots.

15. The system of claim 11, wherein the laser pointer includes a single laser emitter and the optical system of the UAV is a stereo optical system with two imagers.

16. An unmanned aerial vehicle, UAV, comprising:
a processor;
a wireless communication interface coupled to the processor; and
an optical system comprising an imager,
wherein the processor is configured to
guide the UAV along a set of determined waypoints from an initial position of the UAV to a position proximate to a target position based on a laser beam emitted from a laser emitter of a laser pointer; and
guide the UAV, responsive to detection of the laser beam impinging on a target using an image captured by the imager, from the position proximate to the target position to the target position using the optical system.

17. The UAV of claim 16, wherein the processor is further configured to:
determine the set of waypoints based on projection of the UAV initial position onto the laser beam, which is pointing at the target.

18. The UAV of claim 16, wherein the wireless communication interface is configured to:
receive the set of determined waypoints over an air interface from a laser pointer or from a base station.

19. The UAV of claim 16, wherein the laser beam comprises first, second, and third laser beams that are spaced apart to form an equilateral triangle, and the first, second and third laser beam form corresponding first, second, and third laser dots on the target, wherein the processor of the UAV is configured to
determine a distance in pixels between the first, second, and third laser dots;
determine adjustments to an orientation of the UAV to the target or the UAV's distance from the target based on the distance in pixels between the first, second, and third laser dots.

20. The UAV of claim 16, wherein the laser beam is a single laser beam and the optical system is a stereo optical system with two imagers.

* * * * *